(12) United States Patent
Hanne (10) Patent No.: US 9,829,135 B2
(45) Date of Patent: Nov. 28, 2017

(54) PIPE JOINT

(71) Applicant: SMC KABUSHIKI KAISHA, Chiyoda-ku (JP)

(72) Inventor: Hiroshi Hanne, Tsukubamirai (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 111 days.

(21) Appl. No.: 13/930,449

(22) Filed: Jun. 28, 2013

(65) Prior Publication Data

US 2014/0183858 A1   Jul. 3, 2014

(30) Foreign Application Priority Data

Dec. 28, 2012  (JP) ................................. 2012-286790

(51) Int. Cl.
  *F16L 37/091*  (2006.01)
  *F16L 37/092*  (2006.01)

(52) U.S. Cl.
  CPC ......... *F16L 37/091* (2013.01); *F16L 37/0925* (2013.01)

(58) Field of Classification Search
  CPC .. F16L 37/091; F16L 37/0925; F16L 37/0982
  See application file for complete search history.

(56) References Cited

U.S. PATENT DOCUMENTS

| | | | |
|---|---|---|---|
| 7,850,208 B2 * | 12/2010 | Greenberger | F16L 19/08 285/243 |
| 2003/0122372 A1 | 7/2003 | Muto | |
| 2005/0285394 A1 * | 12/2005 | Muto | 285/307 |
| 2006/0012170 A1 * | 1/2006 | Jeong | 285/307 |
| 2007/0138791 A1 * | 6/2007 | Greenberger | 285/322 |
| 2009/0033090 A1 * | 2/2009 | Stoll et al. | 285/317 |

FOREIGN PATENT DOCUMENTS

| | | |
|---|---|---|
| JP | H02-271193 | 11/1990 |
| JP | 2002-267073 | 9/2002 |
| JP | 4016199 | 9/2007 |
| JP | 2010-54020 A | 3/2010 |
| JP | 2010-261555 | 11/2010 |
| JP | 2012-77804 A | 4/2012 |

OTHER PUBLICATIONS

Japanese Office Action dated Feb. 10, 2015 in Patent Application No. 2012-286790 (with Partial English Translation).
Office Action dated Sep. 8, 2015 in Japanese Patent Application No. 2012-286790.

* cited by examiner

*Primary Examiner* — James M Hewitt
(74) *Attorney, Agent, or Firm* — Oblon, McClelland, Maier & Neustadt, L.L.P.

(57) ABSTRACT

A pipe joint is equipped with a body, and an attachment and detachment mechanism by which a fluid tube is mounted detachably with respect to the body. A pawl of a chuck that constitutes the attachment and detachment mechanism includes a stopper member that abuts against an outer circumferential surface of the fluid tube, and piercing members, distal ends of which project more toward a side of the fluid tube than the stopper member and pierce into the outer circumferential surface of the fluid tube.

4 Claims, 6 Drawing Sheets

PIPE JOINT

CROSS-REFERENCE TO RELATED APPLICATION

This application is based upon and claims the benefit of priority from Japanese Patent Application No. 2012-286790 filed on Dec. 28, 2012, the contents of which are incorporated herein by reference.

BACKGROUND OF THE INVENTION

Field of the Invention

The present invention relates to a pipe joint for connecting a tube through which a fluid is introduced and discharged, for example.

Description of the Related Art

Heretofore, a pipe joint has been used for connecting a tube to a fluid pressure device such as a cylinder or the like.

For example, the pipe joint disclosed in Japanese Patent No. 4016199 has a substantially cylindrical body. In the interior of the body, there are provided a substantially cylindrical sleeve that guides a tube along an axial direction, an annular packing for retaining an airtight condition between the body and the tube, a substantially cylindrical chuck for retaining the tube in the body, an engagement member for fixing the chuck in the interior of the body, and a release bush for facilitating separation and detachment of the chuck from the tube when the tube is taken out from the body.

In such a pipe joint, the chuck includes an inclined section, which is gradually expanded in diameter in a radial outward direction from one end side toward another end side of the chuck, an expanded diameter portion that extends substantially in parallel with an inner circumferential surface of the body, and a planar surface section, which is folded toward an inner circumferential side roughly perpendicular with respect to the expanded diameter portion.

On the other end side of the chuck, the distal end of the planar surface portion projects inwardly and is inclined at a predetermined angle, so as to be capable of piercing the outer circumferential surface of the tube. More specifically, the distal end of the planar surface portion functions as an engagement pawl for engaging the tube in the interior of the body.

On the other hand, on the planar surface portion in the vicinity of the engagement pawl, a recess is provided, which is formed in a curved shape curving toward one end of the chuck. When the engagement pawl is made to pierce the outer circumferential surface of the tube, a portion of the outer circumferential surface of the tube enters inside the recess. The portion of the outer circumferential surface of the tube abuts against an inner wall surface of the recess, whereby the tube is prevented from entering further into the recess by the inner wall surface thereof. Owing thereto, the amount by which the engagement pawl pierces with respect to the tube, i.e., the depth at which the engagement pawl is made to pierce into the tube, is restricted to a predetermined length (see Japanese Patent No. 4016199).

SUMMARY OF THE INVENTION

The present invention, in relation to the disclosure of Japanese Patent No. 4016199, has the object of providing a pipe joint, which makes it difficult for the tube to be severed, by avoiding a situation in which engagement pawls are caused to pierce the tube more than necessary when the tube is pulled excessively, and which enables the tube to be easily detached from the pipe joint when the release bush abuts against the chuck and the chuck opening is widened thereby.

To achieve the aforementioned object, the present invention is characterized by a pipe joint comprising a body in which a tube is inserted, and an attachment and detachment mechanism disposed in the interior of the body for mounting the tube detachably with respect to the body. The attachment and detachment mechanism includes a chuck that retains the tube through an engagement pawl. The engagement pawl comprises a stopper member that abuts against an outer circumferential surface of the tube, and a piercing member, a distal end of which projects more toward a side of the tube than the stopper member and pierces into the outer circumferential surface of the tube.

According to the present invention, when the engagement pawl pierces the tube, the stopper member comes into abutment against the outer circumferential surface of the tube, and therefore, excessive piercing, in which the piercing member pierces the tube more than needed, can be prevented. Owing thereto, when the release bush abuts against the chuck and the chuck is widened, the tube can easily be disengaged and separated from the pipe joint.

Further, with the pipe joint, preferably, an abutment surface of the stopper member, which abuts against the outer circumferential surface of the tube, is formed with a curved surface.

In this manner, as a result of forming the abutment surface as a curved surface, which abuts against the outer circumferential surface of the tube, excessive biting in of the distal end of the piercing member with respect to the tube can suitably be avoided.

Further, with the pipe joint, preferably, a portion of a distal end of the stopper member that constitutes the engagement pawl is formed with a greater length than the piercing member, and is folded back at a predetermined position.

In this manner, by forming the stopper member such that a portion of the distal end of the engagement pawl has a length dimension greater than that of the piercing member, and is folded back at a predetermined position, compared to the piercing member, the thickness of the stopper member is increased and high strength is imparted to the stopper member. Further, by folding back a portion of the distal end of the engagement pawl, the stopper member can suitably be formed easily and inexpensively.

Further, with the pipe joint, the piercing member preferably comprises plural piercing members, which are disposed in point symmetry with respect to an axis of the chuck.

In this manner, the piercing members are provided as a plurality of piercing members in point symmetry with respect to the axis of the tube, whereby opposing piercing members can pierce into the tube with point symmetry, and the tube can stably be maintained. Owing thereto, disengagement and unintended pulling out of the tube from the body can reliably be prevented.

Furthermore, with the pipe joint, preferably, the stopper member and the piercing member of the engagement pawl are formed integrally by a resilient plate-shaped body.

In this manner, by forming the stopper member and the piercing member of the engagement pawl integrally using a resilient plate-shaped body, when the engagement pawl pierces into the tube, or when the engagement pawl is taken out from the tube, the opening of the chuck can suitably be widened or expanded by the elastic force.

According to the present invention, at the time that the engagement pawls pierce into the tube, the stoppers, which constitute part of the engagement pawls, abut against the outer circumferential surface of the tube, whereby the engagement pawls can be prevented from piercing more than necessary into the tube. As a result, it is unlikely that the tube will be cut or severed, even if the tube is pulled on excessively. Further, the opening of the chuck can be widened when the release bush is made to abut against the chuck, thereby easily enabling the tube to be disengaged from the pipe joint.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

A preferred embodiment of a pipe joint according to the present invention will be described below with reference to the accompanying drawings.

Figure 1:
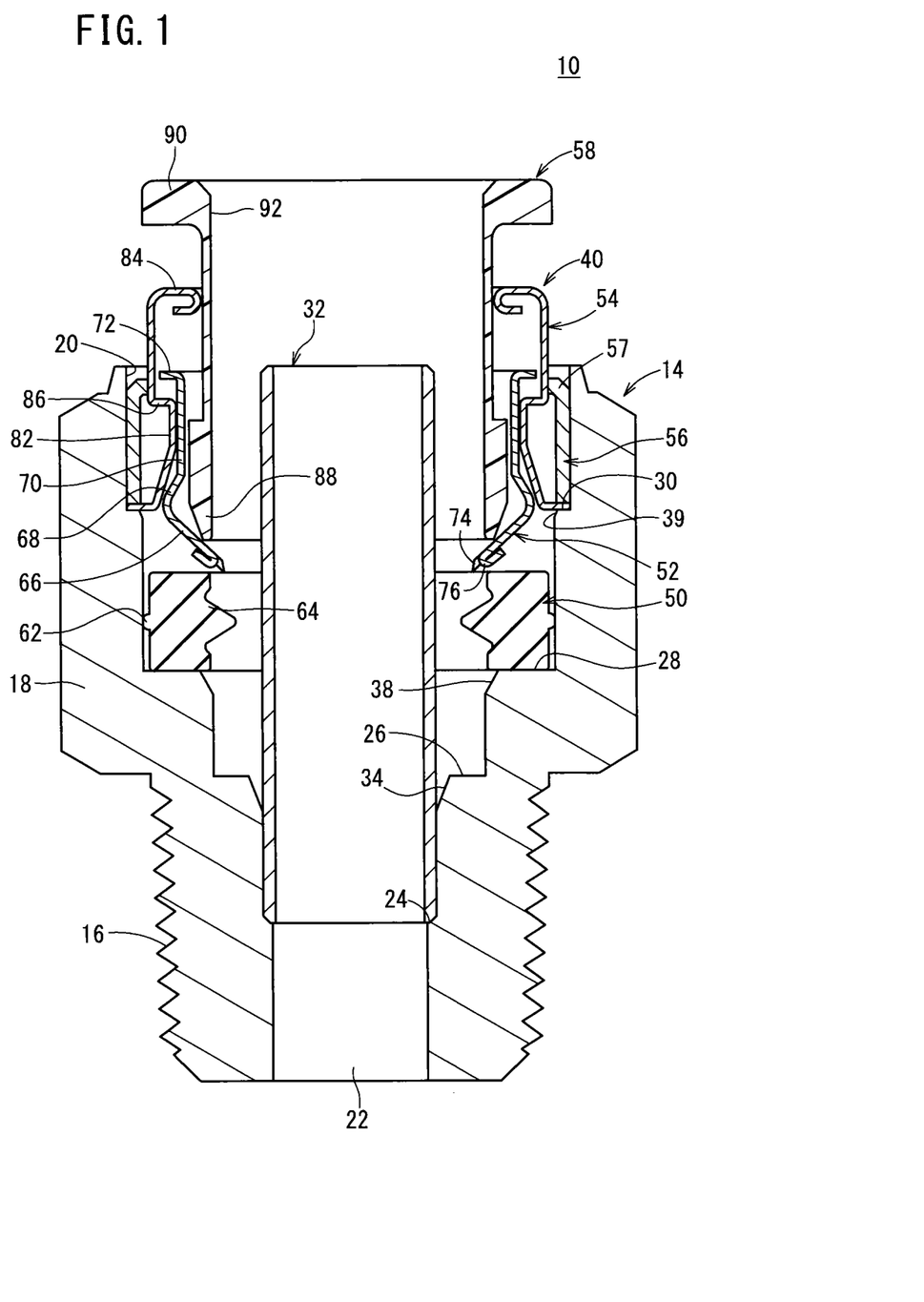
FIG. 1 is a vertical cross sectional view along a lengthwise direction of a pipe joint according to an embodiment of the present invention.
Figure 2:
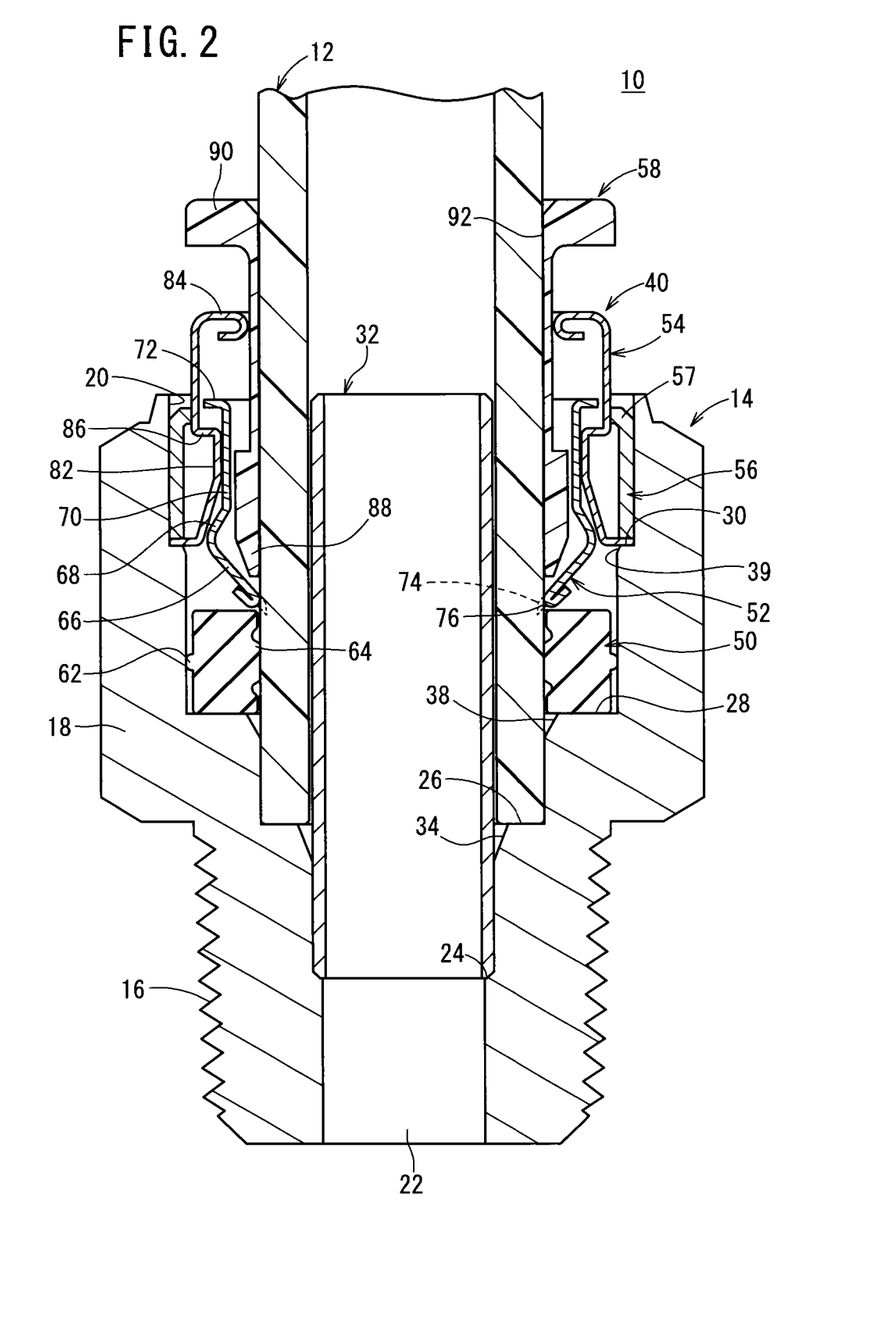
FIG. 2 is a vertical cross sectional view along a lengthwise direction showing a condition in which a fluid tube is inserted into the pipe joint shown in FIG. 1.
Figure 3:
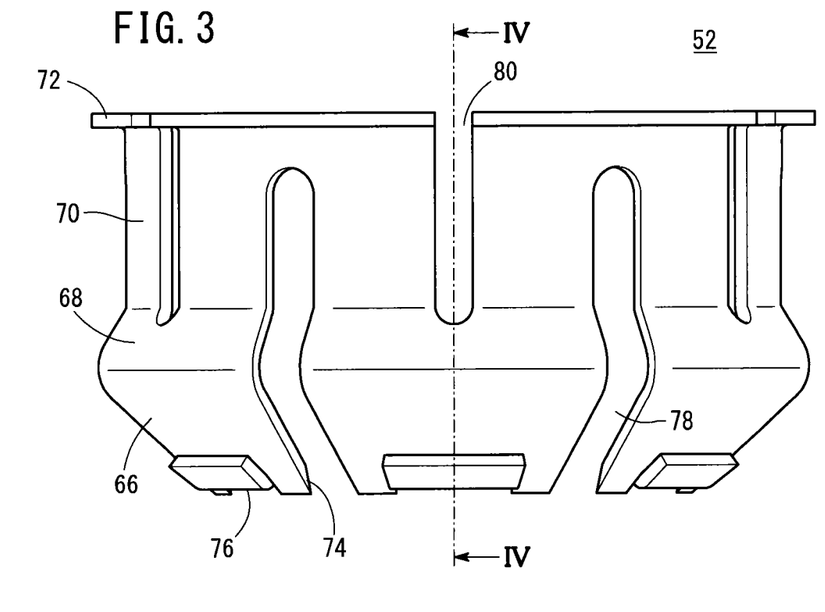
FIG. 3 is a side view of a chuck that constitutes part of the pipe joint shown in FIG. 1.
Figure 4:
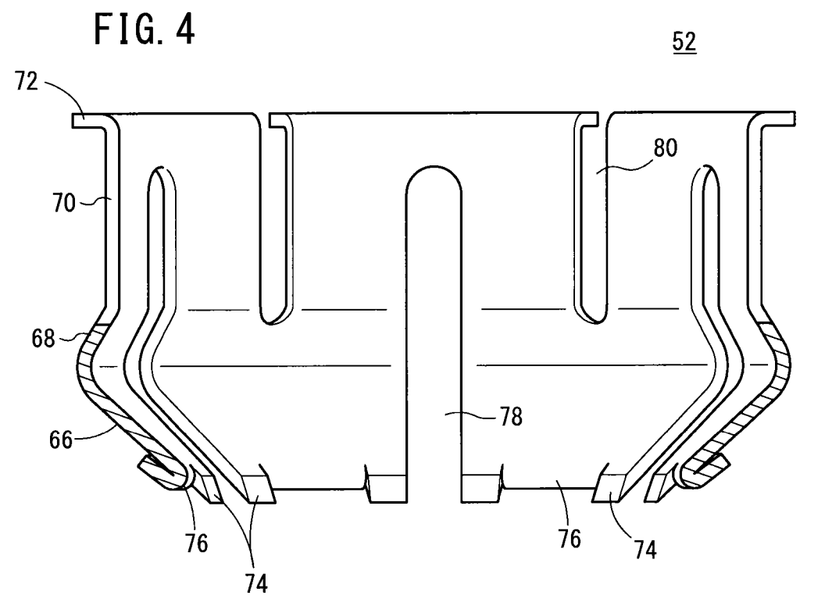
FIG. 4 is a cross sectional view taken along line IV-IV of the chuck shown in FIG. 3.

In FIG. 1, reference numeral 10 indicates a pipe joint according to an embodiment of the present invention. As shown in FIG. 2, a fluid tube (tube) 12 is installed detachably in the pipe joint 10, and the pipe joint 10 is connected to a non-illustrated fluid pressure device such as a cylinder or the like, for example.

The pipe joint 10, for example, includes a cylindrical body 14 made from a metal material such as stainless steel or the like. A connector 16 in which screw threads are engraved for screw-engagement to a port of a non-illustrated fluid device is formed on one end side of the body 14, and a fastener 18, which is hexagonal in cross section, is formed in a substantially central portion on the outer circumferential surface of the body 14 along the axial direction. An opening 20 is formed on another end side of the body 14 into which the fluid tube 12, which is made from a resin material, is inserted.

Further, in the interior of the body 14, a passage 22 is formed that penetrates through the body 14 from one end side to the other end side thereof, so as to communicate with the opening 20. Additionally, in the interior of the passage 22, a first stepped portion 24, a second stepped portion 26, a third stepped portion 28, and a fourth stepped portion 30 are formed, which expand in diameter in this order from the side of the connector 16. One end of a sleeve 32, which is formed in a cylindrical shape and is inserted from the opening 20, is seated on the first stepped portion 24. A first tapered surface 34 is formed at a location where the first stepped portion 24 ends, and extends up to the second stepped portion 26.

As shown in FIG. 2, the second stepped portion 26 forms a stepped portion on which one end of the fluid tube 12, which is inserted from the other end side of the body 14, is seated. A second tapered surface 38 is formed at a location where the second stepped portion 26 ends, and extends up to the third stepped portion 28.

Furthermore, the second stepped portion 26 is connected to the third stepped portion 28 via the second tapered surface 38.

A third tapered surface 39 is formed at a location where the third stepped portion 28 ends, and extends up to the fourth stepped portion 30.

In the interior of the passage 22, which is formed in the foregoing manner by the first stepped portion 24, the second stepped portion 26, the third stepped portion 28, and the fourth stepped portion 30, an attachment and detachment mechanism 40 is assembled for enabling the fluid tube 12 to be inserted from the side of the opening 20 and detachably installed with respect to the body 14.

The attachment and detachment mechanism 40 comprises a substantially cylindrical sleeve 32 for guiding the fluid tube 12 into the interior of the body 14, a substantially annular packing 50, a chuck 52 for latching engagement with the fluid tube 12, a first guide member 54 that is coupled to the chuck 52, a second guide member 56 that fixes the first guide member 54 in the body 14, and a release bush 58, which is displaceable in an axial direction along the first guide member 54.

The sleeve 32 is formed in a substantially cylindrical shape. The outer diameter of the sleeve 32 is of the same diameter, or is of a slightly smaller diameter, as the inner diameter of the first stepped portion 24. Both ends of the sleeve 32 are formed in tapered shapes, the outer diameters of which become slightly smaller toward respective distal ends of the sleeve 32.

The sleeve 32 is inserted from the opening 20 into the passage 22 of the body 14. The sleeve 32 is guided by the first tapered surface 34 and enters into the passage 22, such that one end thereof is seated on and fixed with respect to the first stepped portion 24. When fixed in the interior of the body 14, the length of the sleeve 32 in the axial direction is preferably of a size that extends from the first stepped portion 24 to the opening 20 of the body 14.

The packing 50, for example, is formed in a substantially annular shape from a resilient material such as rubber or the like, and is inserted from the opening 20 so as to surround the sleeve 32 and be seated on the third stepped portion 28. On the outer circumferential surface of the packing 50, a projection 62 is formed that abuts against the circumferential wall surrounding the third stepped portion 28, whereas on the inner circumferential surface thereof, a sealing protrusion 64 is formed that projects in a direction oriented toward the sleeve 32.

The chuck 52, for example, is formed in a substantially cylindrical shape by press-working a thin metallic plate (plate-shaped body).

As shown in FIGS. 3 through 6, the chuck 52 includes pawls (engagement pawls) 66 provided on one end side thereof, and a barrel portion 70 provided at the other end thereof. A bulging portion 68, which is expanded in diameter in a diametrically outward direction, is formed between the pawls 66 and the barrel portion 70. At a location on the terminal end of the barrel portion 70, a flange 72 is formed, which extends outwardly.

On the chuck 52, six first slits 78 are formed at equal intervals, which extend from the pawls 66 and reach the vicinity of the flange 72 via the bulging portion 68, whereas six second slits 80 are formed thereon at equal intervals extending from the flange 72 to the bulging portion 68. As easily understood from FIGS. 3 and 4, the first slits 78 and the second slits 80 extend in the axial direction in such a manner as to not communicate mutually with one another.

Each of the pawls 66 includes a stopper member 76 and piercing members 74 on the edge of one end side thereof. In actuality, the piercing members 74 are provided as a pair on opposite side edges of the stopper member 76, and ends of the piercing members 74 are constituted as sharpened piercing blades. On the other hand, the stopper member 76 is formed with a length dimension in the axial direction that is greater than that of the piercing members 74, and the end of the stopper member 76 is folded diametrically outward. As a result, the point where the stopper member 76 is folded is at a more backwardly disposed position than the piercing members 74.

As a result of being constructed in the foregoing manner, the pawls 66 of the chuck 52 are expandable and contractible elastically together with the bulging portion 68 via the first slits 78.

As shown in FIG. 1, one end of the first guide member 54 is folded outward in the form of a flange and is seated on the fourth stepped portion 30. The first guide member 54 is formed with a modified approximate S-shape in cross section. After the other end side thereof is bent inwardly and then oriented downward, the other end terminates in an outwardly bent portion. The curved location forms a rear end part 84 of the first guide member 54.

The one end of the first guide member 54 is formed as a front end part 82 thereof. The front end part 82, after extending roughly from the center of the first guide member 54 substantially in parallel with the inner circumferential surface of the passage 22, expands in diameter slightly in a radial outward direction, and as noted above, the distal end thereof is folded in a radial outward direction and is seated on the fourth stepped portion 30.

Furthermore, a substantially cylindrical second guide member 56 is inserted through the opening 20. The second guide member 56 is provided on the outside of the first guide member 54, and one end of the second guide member 56 is seated on the upper surface of the front end part 82 of the first guide member 54. As a result, as shown in FIG. 1, the end of the front end part 82 is gripped between the fourth stepped portion 30 and the second guide member 56, and therefore, displacement of the first guide member 54 is restricted in the axial direction. Moreover, a flange 57 that is formed on the other end side of the second guide member 56 abuts against an outer circumferential surface parallel to the passage 22, which is formed on the other end side of the first guide member 54, so that displacement of the first guide member 54 in a direction perpendicular to the axial direction also is restricted.

The release bush 58 is inserted from the opening that is formed in the center of the rear end part 84. As a result, the location provided on the other end side of the first guide member 54, which is curved inwardly perpendicular to the axial direction, performs a guiding action for facilitating insertion of the release bush 58.

In this manner, the first guide member 54 restricts displacement in the axial direction of the chuck 52, and also serves to guide the release bush 58 along the axial direction.

One end side of the second guide member 56 abuts against an end of the front end part 82 of the first guide member 54, and the outer circumferential surface of the second guide member 56 abuts against the inner circumferential surface of the passage 22. The distal end of the other end side of the second guide member 56 is reduced in diameter and bent in a radial inward direction, so that as shown in FIG. 1, the distal end abuts against the outer circumferential surface of the first guide member 54.

After the first guide member 54 has been inserted from the opening 20, the second guide member 56 is inserted along the outer circumferential surface of the first guide member 54 and the inner circumferential surface of the passage 22. After the one end of the second guide member 56 has abutted against the front end part 82 of the first guide member 54, the outer circumference of the opening 20 of the other end side of the body 14 is crimped by a non-illustrated jig, whereby the second guide member 56 is fixed in the interior of the passage 22.

A tapered portion 88, which bulges radially outward for a predetermined length and gradually is reduced in diameter toward the distal end thereof, is formed on the end of the release bush 58. The tapered portion 88 is disposed to face toward the pawls 66 of the chuck 52.

Further, the other end of the release bush 58 is formed with a flange 90 thereon, which is expanded radially outward in diameter. The outer diameter of the flange 90 is slightly smaller than the inner diameter of the opening 20.

In the interior of the release bush 58, a through hole 92 is formed that penetrates through the release bush 58 in the axial direction, and into which the fluid tube 12 is inserted. The inner diameter of the through hole 92 is substantially the same or slightly greater in diameter than the outer diameter of the fluid tube 12, and the inner diameter is substantially constant throughout the through hole 92.

The pipe joint 10 according to the present embodiment is constructed basically as described above. Next operations and effects of the pipe joint 10 will be explained below. In the following explanations, a state is assumed in which the connector 16 of the pipe joint 10 is screw-engaged and fixed beforehand with respect to a fluid pressure device such as a non-illustrated cylinder or the like.

As shown in FIG. 1, in an uninstalled state in which the fluid tube 12 is not mounted in the pipe joint 10, the fluid tube 12 is inserted along the sleeve 32 from the through hole 92 of the release bush 58, whereupon the end surface of the fluid tube 12 comes into abutment and is seated on the second stepped portion 26 of the body 14 (see FIG. 2).

At this time, the sealing protrusion 64 of the packing 50 is in contact with the outer circumferential surface of the fluid tube 12, and by the sealing protrusion 64 being pressed into contact with the fluid tube 12, leakage of fluid to the exterior when fluid passes through the passage 22 is prevented.

In this manner, when the fluid tube 12 is inserted from the opening of the release bush 58, the pawls 66 of the chuck 52 are pressed and widened in a radial outward direction by the outer circumferential surface of the fluid tube 12. As a result, a condition is brought about in which the sharp distal ends of the piercing members 74 of the pawls 66 contact the outer circumferential surface of the fluid tube 12.

After the fluid tube 12 has been inserted into the interior of the release bush 58, the fluid tube 12 is pulled out slightly in the direction of the flange 90 of the release bush 58. As a result, as shown in FIG. 2, the sharp distal ends of the piercing members 74, which are in abutment against the outer circumferential surface of the fluid tube 12, pierce into the outer circumferential surface of the fluid tube 12.

In this condition, furthermore, when the fluid tube 12 is pulled in the direction of the flange 90 of the release bush 58, the stopper members 76 of the pawls 66 abut against the outer circumferential surface of the fluid tube 12. As a result, the fluid tube 12 is engaged in the interior of the pipe joint 10 by the chuck 52, and is installed with respect to the pipe joint 10. Moreover, even if one attempts to pull out the fluid tube 12, the stopper members 76 prevent the piercing members 74 from piercing further into the fluid tube 12.

More specifically, the stopper members 76 control the amount by which the piercing members 74 pierce into the fluid tube 12. In this manner, since the pawls 66 are prevented from biting into the fluid tube 12 more than necessary, even if the fluid tube 12 is pulled on excessively, it is unlikely that the fluid tube 12 will become cut or severed. Moreover, by modifying the angle of inclination of the pawls 66, the length and number of the piercing members 74, the arc length in the circumferential direction of the piercing members 74, the thickness of the stopper members 76, and the degree of curvature of the stopper members 76, etc., the amount by which the piercing members 74 pierce into the fluid tube 12 can be set properly.

When the fluid tube 12 is detached and separated from the pipe joint 10, the flange 90 of the release bush 58 is pressed in a direction toward the connector 16. Under the pressing action of the flange 90, the tapered portion 88 of the release bush 58 presses the side surfaces of the pawls 66, whereby the pawls 66 are displaced in the direction of the packing 50, and the one end of the chuck 52 is expanded and opens forcibly in a radial outward direction. Owing thereto, the piercing members 74, which pierce into the outer circumferential surface of the fluid tube 12, separate away from the outer circumferential surface of the fluid tube 12.

As a result, since the engaged state of the fluid tube 12 is released along the axial direction, the fluid tube 12 can be taken out from the pipe joint 10 by pulling the fluid tube 12 in the axial direction.

According to the present invention, the ends of the pawls 66 do not pierce the outer circumferential surface of the fluid tube 12 more than needed. For this reason, excessive biting in of the pawls 66 with respect to the fluid tube 12 can be avoided. As a result, even if the fluid tube 12 is pulled on excessively, it is difficult for the fluid tube 12 to become severed. Further, the opening of the chuck 52 can be widened when the release bush 58 abuts against the chuck 52, thereby easily enabling the fluid tube 12 to be disengaged and separated from the pipe joint 10.

The abutment surfaces of the stopper members 76, which abut against the outer circumferential surface of the fluid tube 12, are folded back to be formed with curved surfaces and have a total circumferential length greater than the total circumferential length of the piercing members 74, and therefore, the stopper members 76 press on the fluid tube 12 without piercing into the outer circumferential surface of the fluid tube 12. Owing thereto, the pawls 66 are prevented more securely from biting excessively into the fluid tube 12.

The portions of the stopper members 76 on the ends of the pawls 66 are formed with a length dimension that is greater than that of the piercing members 74, and are folded back circumferentially at predetermined positions. As a result, the thickness of the stopper members 76 is increased compared to the piercing members 74, high strength is imparted to the stopper members 76, and the stopper members 76 can be formed easily and inexpensively.

Figure 5:
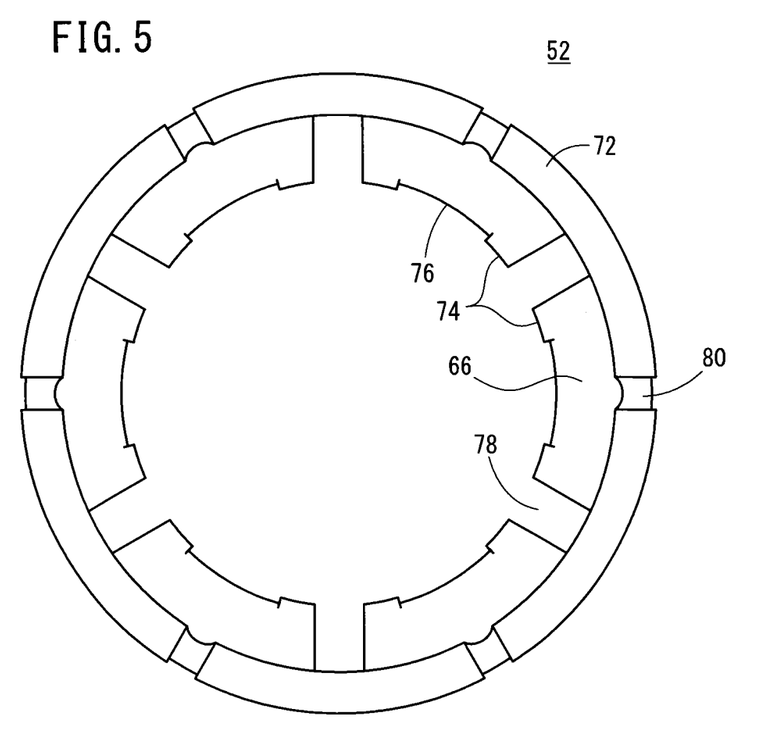
FIG. 5 is a plan view of the chuck shown in FIG. 3.
Figure 6:
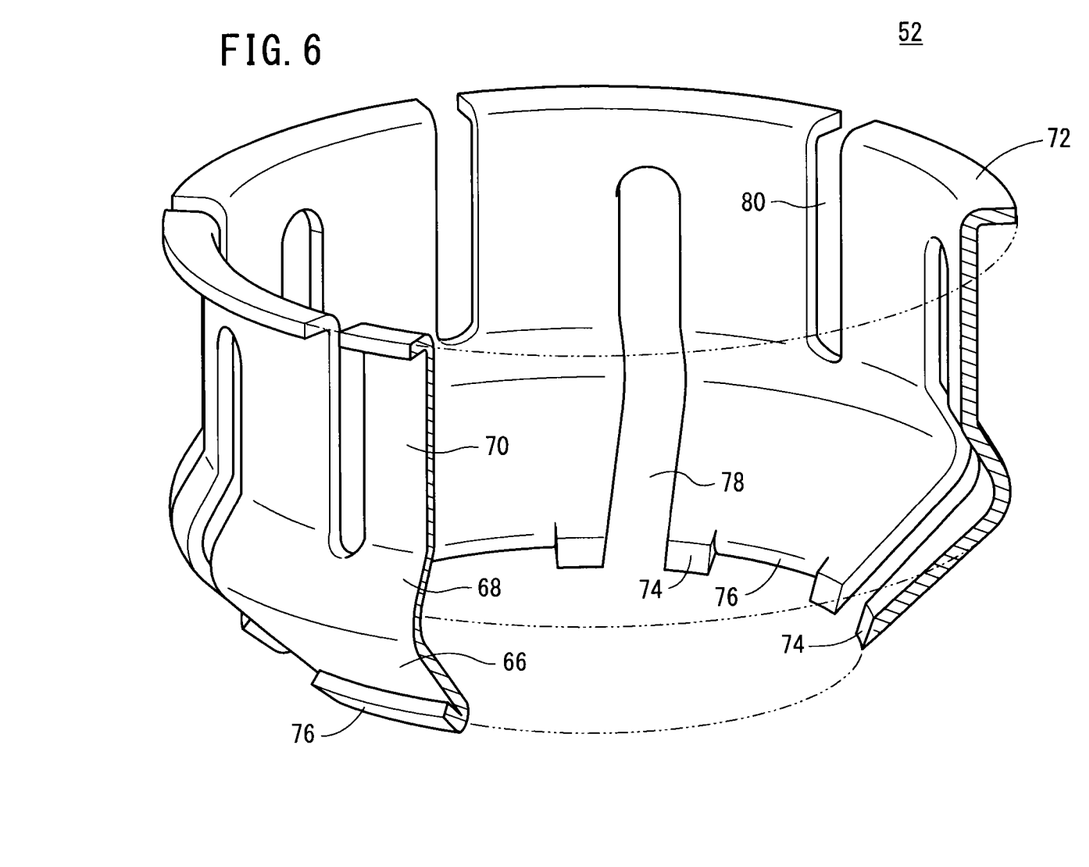
FIG. 6 is a partially cutaway perspective view of the chuck that constitutes part of the pipe joint shown in FIG. 1.

As shown in FIG. 5, the piercing members 74 are provided in plurality and are disposed in point symmetry with respect to the axis of the chuck 52. Consequently, since the piercing members 74, which are disposed in confronting relation, pierce the fluid tube 12 in point symmetry with respect to the axis of the fluid tube 12, the fluid tube 12 can be retained in a stable fashion, together with reliably preventing the fluid tube 12 from becoming disengaged and pulled out from the body 14.

Further, the attachment and detachment mechanism 40 used by the pipe joint 10 is not limited to the structure described above. For example, the sleeve 32 or the second guide member 56 may be dispensed with. More specifically, it is sufficient if the fluid tube 12 can be mounted detachably with respect to the body 14 when the fluid tube 12 is inserted into the interior of the body 14.

Further, the packing 50 used in the pipe joint 10 is not limited to the case of being formed from an elastic material as described above. For example, the packing 50 may be formed from a resin material. More specifically, it is sufficient so long as the packing 50 is made of a material that prevents leakage of fluid from passing between the body 14 and the fluid tube 12 when the packing 50 abuts against the third stepped portion 28 and the outer circumferential surface of the fluid tube 12.

The pipe joint according to the present invention is not limited to the embodiment described above, but various alternative or additional features and structures may be adopted without deviating from the essence and scope of the invention as set forth in the appended claims.

What is claimed is:

1. A pipe joint comprising:
   a body in which a tube may be inserted;
   an attachment and detachment mechanism disposed in the interior of the body for mounting the tube detachably with respect to the body,
   wherein the attachment and detachment mechanism includes:
   a chuck having an engagement pawl that is able to engage the tube inserted in the body, for retaining the tube in the body;
   a first guide member that is coupled to the chuck;
   a second guide member that is provided outside the first guide member and fixes, in the body, the first guide member to the body; and
   a release bush that is provided inside the first guide member and is displaceable along the first guide member,
   wherein the chuck is formed in a substantially cylindrical shape by an elastic plate-shaped body that includes
   a barrel portion that has a given length along an axial direction,
   a bulging portion that is located on one end of the barrel portion and has a portion with a larger diameter than the barrel portion,
   wherein the engagement pawl extends from the bulging portion, and
   a flange that is formed on the other end of the barrel portion, and
   wherein the chuck includes slits that are formed at equal intervals about its circumference, extend from the engagement pawl and reach the barrel portion via the bulging portion; and
   one engagement pawl comprising:
   a stopper member having an abutment surface, which abutment surface is a surface that abuts against an outer circumferential surface of the tube inserted in the body; and
   piercing members, a distal end of each of which projects radially inward toward the tube as compared to the abutment surface of the stopper member, to pierce the outer circumferential surface of the tube inserted in the body, wherein one engagement pawl is arranged between every two adjacent slits, wherein the stopper member and the piercing members are formed integrally, wherein the stopper member is formed between a pair of piercing members that are arranged between adjacent slits, the abutment surface of the stopper member is provided between the pair of piercing members and is formed as a curved surface capable of preventing the piercing members from piercing further into the tube when the abutment surface abuts the tube, and wherein the abutment surface is folded back at a predetermined position of the abutment surface and has a total circumferential length greater than a total circumferential length of the piercing members.

2. The pipe joint according to claim 1, further comprising plural piercing members which are disposed in point symmetry with respect to an axis of the chuck.

3. The pipe joint according to claim 1, wherein the stopper member and the piercing member of the engagement pawl are formed integrally in an elastic plate-shaped body.

4. A pipe joint comprising:
an annular body in which a tube may be inserted; and
an attachment and detachment mechanism disposed in the interior of the annular body for mounting the tube detachably with respect to the annular body, wherein the attachment and detachment mechanism includes:
  a chuck having an engagement pawl with a distal end projecting radially inward of the body to engage the tube inserted in the body for retaining the tube in the body;
  a first guide member that is coupled to the chuck;
  a second guide member that is provided outside the first guide member and fixes, in the body, the first guide member to the body; and
  a release bush that is provided inside the first guide member and is displaceable along the first guide member,
wherein the chuck is formed in a substantially cylindrical shape by an elastic plate-shaped body that includes
  a barrel portion that has a given length along an axial direction,
  a bulging portion that is located on one end of the barrel portion and has a portion with a larger diameter than the barrel portion,
  wherein the engagement pawl extends from the bulging portion, and
  a flange that is formed on the other end of the barrel portion, and wherein the chuck includes slits that are formed at equal intervals about its circumference, extend from the engagement pawl and reach the barrel portion via the bulging portion,
one engagement pawl comprising:
  a stopper member at the distal end of the engagement pawl, the stopper member having an abutment surface, which abutment surface is a surface that abuts against an outer circumferential surface of the tube inserted in the body; and
  piercing members at the distal end of the engagement pawl, wherein a distal end of each piercing member projects radially inward toward the tube as compared to the abutment surface of the stopper member, to pierce the outer circumferential surface of the tube inserted in the body, wherein one engagement pawl is arranged between every two adjacent slits,
  wherein the stopper member and the piercing members are formed integrally,
wherein the stopper member is formed between a pair of the piercing members that are arranged between adjacent slits,
the abutment surface of the stopper member is provided between the pair of piercing members and is formed as a curved surface capable of preventing the piercing member from piercing further into the tube when the abutment surface abuts the tube, and
wherein the abutment surface is folded back at a predetermined position of the abutment surface and has a total circumferential length greater than a total circumferential length of the piercing members.

* * * * *